United States Patent Office 3,606,791
Patented Sept. 21, 1971

3,606,791
**ULTRASONIC INSPECTIONS USING POLY-
SULFONE RESINS AS COUPLANTS**
Richard P. Rathburn, Richmond, and Garth M. Stanton,
San Anselmo, Calif., assignors to Chevron Research
Company, San Francisco, Calif.
No Drawing. Continuation-in-part of application Ser. No.
809,029, Mar. 20, 1969. This application Mar. 16,
1970, Ser. No. 20,069
Int. Cl. G01n 24/00
U.S. Cl. 73—71.5           7 Claims

ABSTRACT OF THE DISCLOSURE

A process is disclosed for making ultrasonic inspections of high surface temperature objects by using a polysulfone resin as a couplant. Surface temperatures of the object at the point of inspection are 400°–1,100° F. or higher.

CROSS-REFERENCE TO RELATED APPLICATION

This application is a continuation-in-part of application Ser. No. 809,029, filed Mar. 20, 1969.

BACKGROUND OF THE INVENTION

This invention relates to processes for transmitting ultrasonic waves into solid materials. More particularly, it relates to such processes for transmitting waves into solid materials having high surface temperatures.

In recent years, ultrasonic processes for non-destructively examining and measuring various properties of solid materials have become extensively used. Ultrasonic processes may be used in measuring thicknesses of solid materials such as steel ship hulls, oil refinery reaction vessels, piping or columns, or plates or beams of materials such as those used in aircraft. Ultrasonic examination is also used to detect flaws in the interior of solid materials such as thick steel plates or welds.

In a typical ultrasonic examination process, one employs a transducer containing an ultrasonic wave generating source, a receiving device to receive the ultrasonic wave reflected from walls or other surfaces of the solid body being examined, and some sort of measurement-indicating device to indicate to the operator the particular quantity being measured, which may be, for instance, the depth or width of a flaw within the solid object being examined. The receiver may be part of the transducer assembly or it may be a separate device. In practice, the ultrasonic waves generated by the transducer pass through the transducer face into the solid material and are reflected from various surfaces within the material. These surfaces may be flaws within the material, welded joints abutting the material, or simply outer surfaces of the material. The reflected wave is detected by the receiver and the signal generated in the receiver upon detection of the wave is passed to the indicating device where it is converted into a signal from which the operator can determine the particular quantity or measurement he seeks. Most often the indicating device is an oscilloscope and the reflected wave signal appears as a peak on the oscilloscope screen. Alternatively, the indicating device signal may appear as the deflection of a needle on a meter, a line on a graph, or even a series of numbers on a printed sheet where the receiving device is connected to a digital output device.

It is found in practice that because of the normal irregularities of the surfaces of the object to be examined and the transducer face, good contact between the transducer face and the object usually cannot be obtained simply by pressing the transducer face against the object. While there will be a number of points of contact between their two surfaces, there will also be numerous points where the surfaces do not touch, thus leaving air gaps between the two surfaces. These air gaps prevent smooth transmission of the ultrasonic waves from the transducer face into the solid body and cause the reflected wave pattern detected by the receiver to be extremely distorted, thus preventing the operator from obtaining satisfactory data from his measurements.

To overcome this problem, couplants are used in ultrasonic examination processes. A couplant is a relatively deformable material which is placed between the surfaces of the transducer and the solid material. The couplant fills substantially all the spaces between the two surfaces and essentially eliminates the troublesome air gaps. The ultrasonic waves pass smoothly from the transducer face, through the couplant, and into the solid body; and where the receiver is an integral part of the transducer, the reflected waves pass smoothly out of the solid material, back through the couplant, and into the transducer.

Most ultrasonic measurements are made on materials which are at ambient temperatures, or temperatures as high as about 400° F. At ambient temperatures and temperatures up to about 200° F., a number of common materials such as water and light lubricating oil make satisfactory couplants. At higher temperatures, up to about 400° F., more viscous materials such as petroleum and silicone greases have been used.

Above 400° F., however, these materials are unsatisfactory for a number of reasons. Some, such as water, boil off or evaporate rapidly, while others such as the greases become extremely fluid and run. These obviously cannot be used on vertical or overhead surfaces. Further, many develop gas bubbles within the couplant and these gas bubbles distort the ultrasonic transmission in much the same way as do air gaps. Consequently, in most cases, ultrasonic inspection processes have been limited to applications at temperatures below about 400° F.

This low temperature limitation has not particularly inhibited use of ultrasonic processes in a number of fields, such as aircraft construction and some phases of ship construction. It has, however, severely limited their usefulness in such fields as oil refining, chemical production, weld inspection, and fabrication of heavy metal plates and beams. This is because many operations in these fields occur at high temperatures, i.e., temperatures above about 400° F. Typical are oil refinery processes in which reaction vessels, transfer pipes, furnaces, and much other metal apparatus operate at these and higher temperatures.

Operators of such high-temperature processes have, for many years, sought a method whereby the high-temperature apparatus could be inspected for flaws, metal lost by corrosion, and other defects, while remaining in service and being operated at the high temperatures. In most cases, such inspection has not been possible and the operator has been forced to remove the apparatus from service and cool it down to a temperature of 400° F. or lower to permit the ultrasonic inspection with conventional couplants. Obviously, this has been an unsatisfactory procedure because of the loss of operating time.

Three methods, not employing polymer couplants, have been used in an attempt to make ultrasonic measurements at elevated temperatures. These, with their attendant disadvantages, are described in detail in aforesaid application Ser. No. 809,029.

DESCRIPTION OF THE PRIOR ART

An article by Ostrofsky in Chemical Engineering, 75, 11, 174 (May 20, 1968) describes low-temperature ultrasonic measuring and briefly discusses suggested means of making measurements at higher temperatures.

U.S. Pat. 3,393,331 suggests that "heat softening plastics," which are exemplified by polyethylene and nylon, may be used as high-temperature couplants. U.S. Pat. 3,394,586 discloses that a polysiloxane elastomer may be used as a delay line transmission element, and suggests that this material may also combine the functions of delay line element and couplant at temperatures up to 1,000° F.

Polysulfone resins are described in articles in Chemistry and Industry, p. 461 (Apr. 13, 1968) and The Modern Plastics Encyclopedia, 1968 edition, p. 259, as well as in U.S. Pats. 3,225,104; 3,359,898; 3,380,878; and 3,408,437.

SUMMARY

In summary, this invention is a process for ultrasonically inspecting an essentially solid body from a surface point on that body where the surface temperature is 400° F. or greater, wherein ultrasonic waves are transmitted from the face of a transducer through a couplant into the body at the surface point and undistorted reflections of the waves are detected after emerging from the body, which comprises using as the couplant a polysulfone resin.

DETAILED DESCRIPTION OF THE INVENTION

We have now discovered the present process by which high-temperature ultrasonic measurements may be made rapidly and with considerable ease, safety to the operator, and reproducibility. Further, measurements may be made on nonhorizontal surfaces, such as vertical or overhead pipes or vertical reaction vessels without encountering the problems of couplants which run or drip from the spot onto which they are placed.

In its broadest form, this invention is an improved process for ultrasonically inspecting an essentially solid body from a surface point on that body where the structure temperature is 400° F. or greater, wherein ultrasonic waves are transmitted from the face of a transducer through a couplant into the body at the surface point and undistorted reflections of the waves are detected after emerging from the body, which improvement comprises using as the couplant a polysulfone resin. Preferred embodiments will be described below.

POLYSULFONE RESIN: CHARACTERISTICS

A principal feature of this invention is the use of a polysulfone resin as a couplant. This type of polymeric material is described in detail below. Its usefulness in the process of this invention is based on its ability to transmit ultrasonic waves without distortion at temperatures above 400° F. The polysulfone resins are particularly effective in transmitting ultrasonic waves without distortion at temperatures above 600° F., and most effective at temperatures above 700° F.

In the process of this invention, the temperature of interest is the surface temperature of the solid body at the point at which the body is to be examined ultrasonically. For convenience, this temperature will hereinafter be referred to as $T_s$. In the broadest form of this invention, $T_s$ is greater than 400° F. Because they soften more readily at higher temperatures, the polysulfones of this invention are more effective couplants when $T_s$ is greater than 600° F., and particularly when $T_s$ is greater than 700° F.

The polysulfone resins useful as couplants in this invention are poly(arylene sulfones) having the monomer unit structure:

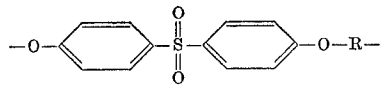

wherein R is a divalent hydrocarbon, halohydrocarbon, or oxahydrocarbon radical. (The "oxahydrocarbon" radical, as defined herein, is a radical containing only oxygen, hydrogen, and carbon atoms. The oxygen atom or atoms will be present only in ether, hydroxy, or carbonyl groups.) In a preferred form, R is a radical comprising two phenylene groups, linked by an alkylene, haloalkylene, or oxalkylene group. (The "oxalkylene" radical is a form of the oxahydrocarbon radical, and is an oxygen derivative of an alkylene radical.) In a more preferred form, R is a hydrocarbon radical comprising two phenylene groups linked by an alkylene group having 1–6 carbon atoms.

These polymers generally have number average molecular weights in the range of 1,000–100,000.

As noted, R represents a wide variety of hydrocarbon and substituted hydrocarbon radicals. A number of these are described in the literature. The more preferred structures are shown below in Table I. Also included in Table I is the glass transition temperature of the polymer containing each of the listed structures. The significance of the glass transition temperature, designated $T_g$, will be discussed below.

TABLE I

| Radical | Structure | $T_g$, °F. |
|---|---|---|
| A | 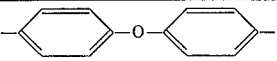 | 356 |
| B | 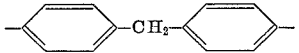 | 356 |
| C | 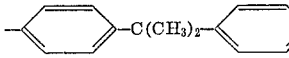 | 374 |
| D | 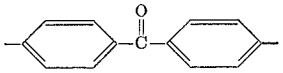 | 401 |
| E | 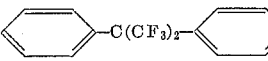 | 401 |

Other representative R radicals less preferred, but suitable for use in this invention, are listed in Table II below. These are meant to be illustrative only, and not exclusive; any polysulfone resin which has the characteristics described in this specification will be suitable for use as a couplant.

TABLE II

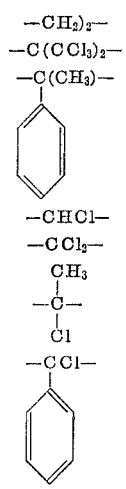

An important characteristic of the polysulfone resin is its "deformability." In order to be useful in this process, the polysulfone resin must be sufficiently deformable at $T_s$ that it substantially fits all the contours of both the transducer face and the surface of the solid body at the surface point of examination. It must fill the space between the body surface and the transducer face without creating any bubbles or gaps in the couplant itself. It would also be desirable for it to have the ability to adhere to the surface of the object being examined if that surface is rounded or nonhorizontal.

Directly related to the deformability of the polysulfone resin is its glass transition temperature. The glass transition temperature of a polymer is defined on page 26 of the 1968 edition of the Modern Plastics Encyclopedia (McGraw-Hill Publishing Company), as the temperature below which molecular chain motion in the polymer is frozen in. Above this temperature, there is sufficient energy to permit motion and undulations in the polymer chain. Below the glass transition temperature, the polymeric materials are still hard, and often brittle.

In order to guarantee the deformability of the polysulfone resin, it is required that its glass transition temperature be less than $T_s$. If the glass transition temperature is higher than $T_s$, the polysulfone resin will remain hard and cannot be deformed sufficiently to act as a satisfactory couplant. A number of the polysulfone resins such as that in which R is the radical

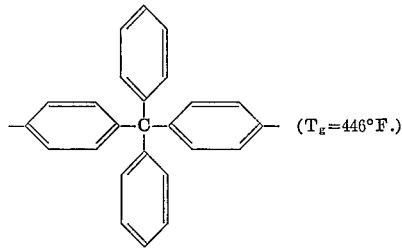

($T_g$=446°F.)

will have glass transition temperatures higher than the 400° F. minimum $T_s$ noted above. These are included within the scope of this invention, but are limited to use in the preferred embodiments wherein $T_s$ is 600 or 700° F., depending on the particular polysulfone resin used.

Another principal characteristic of the polysulfone resin is what will herein be termed the "distortion temperature." This is defined as the temperature above which the polysulfone resin develops physical characteristics which distort the ultrasonic waves passing through the couplant and thus prevent the collection of reliable ultrasonic examination data. This occurrence of distortion-causing characteristics may take any one of several forms: most commonly the polysulfone resin melts, chars, or flames. It is deemed to have melted when it becomes fluid enough to run relatively freely or when gaseous bubbles begin to form in the polymeric material. It is deemed to have charred when a layer of carbon has been formed of sufficient thickness such that the surface region of the polymeric material no longer has a tacky consistency. The flaming point is, of course, apparent. The polysulfones useful in this invention will all have distortion temperatures greater than $T_s$. The exact distortion temperature will depend on the particular polysulfone in question, so different polysulfones will be operative over different temperature ranges. Distortion temperatures of some polysulfones useful in this invention will be in excess of 1,100° F. so, by proper selection of the individual polysulfone resin couplants, ultrasonic inspections can be made at any $T_s$ in the range of 400°–1,100° F. or greater.

The occurrence of the distortion-producing characteristic, however, is not limited to melting, charring, or flaming. All other forms of change of the physical characteristics which cause distortion of the ultrasonic wave are intended to be included within this definition. This would include such occurrences as oxidation of the surface layer of the resin where such oxidation causes distortion of the ultrasonic waves.

POLYSULFONE RESIN: PREPARATION

The preparation of polysulfone resins is described in the art, particularly in the article from Chemistry and Industry cited above. In one typical reaction scheme, a dihalide such as di(p-bromophenyl)sulfone is reacted with a bis-phenol such as dimethyl di(p-phenol)methane to form the polysulfone resin.

PRACTICE OF THE INVENTION

Operation of the process of this invention, as practiced at our direction by the Equipment Section of the Standard Oil Company of California Refinery at Richmond, Calif., is basically similar to the operation of processes for making ultrasonic measurements at temperatures below 300° F. Because the transducer itself must be protected from heat, however, a heat sink or "delay line" is usually placed between the hot surface and the actual face of the transducer. The presence of this delay line does not affect the operation of the process of this invention. Consequently, throughout this specification and in the claims, the term "face of the transducer" will be understood to signify the face of the delay line where appropriate operational requirements call for use of a delay line. In essentially all cases, however, a delay line will itself require a couplant to be used; the delay line does not substitute for the couplant, for the delay line is not normally sufficiently deformable to form a satisfactory couplant.

In practice, the operator of the ultrasonic apparatus locates the exact surface point on the vessel, pipe, plate, or other solid object where he wishes to make his inspection. He places the polysulfone couplant on the object's surface at that point. He then waits a short time, generally no more than a few seconds, for the heat from the surface to soften the couplant. (If the couplant has adhesive properties, the operator may, if desired, wait for several minutes after the couplant softens before continuing with the examination.) He then pushes the face of the transducer against the softened couplant. This forces the deformable couplant into the contours of both the transducer face and the object's surface, and completely fills the gap between the two. Ultrasonic waves generated by the transducer are then transmitted through the transducer face and couplant into the solid body.

The reflected waves are detected as they emerge from the body, either by the transducer itself (now acting as a receiver) or by a separate receiver in contact with the object through a second couplant. This second couplant may be a polysulfone resin if the surface temperature at the reception point is greater than 400° F. If it is, it may be the same or a different resin as that which is in contact with the transducer. If the surface temperature at the reception point is less than 400° F., a conventional couplant may be used. The reflected wave is monitored by a visual display means which has usually been precalibrated to display the desired measurement directly. For instance, if an oscilloscope is used as the display means, the separation of reflected wave peak heights can be calibrated to indicate thickness of a pipe wall directly in inches or centimeters.

We have found it most convenient to use two men to operate the process of this invention, although in many cases one man can easily perform the operations. When two men are used, the power source for the transducer and receiver and the display means are grouped in a central location (we have collected these in a mobile van) and the transducer and receiver are located at the inspection site remote from that central location but connected thereto by electrical cables. One man monitors the equipment at the central location while the other, encumbered only by the couplant, transducer, and receiver, and their trailing cables, makes the measurement at the desired inspection site. Since transducer/receiver combinations housed in containers having external length, width, and depth each less than one inch are commercially available and, as will be discussed below, the couplant is easily carried, the man making the actual inspection can easily work in confined spaces. Further, not being burdened with heavy or bulky equipment, he can often reach points (by climbing, crawling, etc.) that would be inaccessible to a man who was so burdened.

The polysulfone resins may be used in many convenient forms. At ambient temperatures they are solid, and those commercially available are often in the form of large thin sheets. We have found it convenient to use the material in small strips. The actual size will depend on the largest dimension of the transducer face. We have used a transducer with a one-half inch diameter face; the couplant strips used in conjunction with this instrument were approximately 4–6 inches long and one-half inch wide.

Thickness of the polymeric material should be minimal, providing only enough thickness to fit the contours of the transducer face and object surface and maintain a small, couplant-filled separation between them. Thicknesses should be in the range of about 0.001–0.2 inch, with 0.004–0.1 inch preferred.

Optimum overall size of the couplant for ease of use is based largely on the poor heat transfer characteristics of the polysulfone resin. Since heat from the object's surface flows only slowly through the material, the couplant should be thin to permit rapid softening of entire thickness of the couplant adjacent the surface inspection point. By having a piece of couplant several times longer than its width, however, the operator can comfortably hold one end of the couplant strip (which is cool) while the other end is in contact with the heated object surface.

Where the couplant is used in the form of a small rectangular thin strip, the operator can easily carry several strips in a pocket or pouch and can make numerous inspections before exhausting his supply of couplant. A single strip of couplant may often be reused several times if it does not adhere so strongly to an object surface that it is torn apart on attempted removal. As an alternative, the couplant, if it is sufficiently flexible at ambient temperatures, may be in the form of a long, narrow, thin strip, coiled such that the operator may pull off whatever length of material he needs for a particular inspection.

Typical applications of the process of this invention are illustrated in Table III below, as Examples 1 through 9. Each of these examples describes an ultrasonic measurement made on a particular piece of oil refinery process equipment. In most cases the purpose of the ultrasonic inspection was to detect flaws or cracks in refinery piping or to measure the wall thickness of piping to determine corrosion damage. Measurements were made using the inspection techniques described above. The polysulfone resin used as a couplant had as its R group the radical designated C in Table I above. The resin was obtained commercially from the Union Carbide Company. Strips of couplant about 12 inches long by one-half inch wide by 0.05 inch thick were used.

In Table III, below, the particular type of refinery apparatus examined is described and the surface temperature at the point of inspection is given. Nominal diameters of the various pipes inspected ranged from 3 inches to 16 inches. All pieces of equipment listed were in full service while being examined.

TABLE III

| Ex. | Apparatus examined | Surface temperature, °F. |
|---|---|---|
| 1 | Hydrocracker furnace crossover lines | 1,100 |
| 2–6 | do | 962 |
| 7 | Coker outlet lines | 950 |
| 8 | Thermal cracker evaporator column bottoms line | 780 |
| 9 | Thermal cracker fractionator column side cut line | 750 |

The uniqueness and superiority of the polysulfone resins are indicated by the data in Table IV below. These data were derived from a series of experiments in which various polymeric materials were tested as couplants at temperatures of 600°–1,000° F. In each case the heated surface used was a laboratory hot plate. The test couplant was applied to the hot plate and the transducer applied to the couplant. Thickness measurements of the heating surface of the hot plate were then attempted, in a manner analogous to that which would be used on pipes, heating vessels, etc. The types of polymers, their trade names, where known, and the results of the experiments are shown in Table IV. Results characterized as "poor" or "excellent" refer to the quality of the ultrasonic signals being received by the transducer through the couplant.

TABLE IV

| Polymer | Trade name | Results |
|---|---|---|
| Polysulfone | | Excellent. |
| Polyamide resin | Versamid (900) | Poor. |
| Polycarbonate | Lexan | Bubbles at >700° F. |
| Epoxy | Epon 1001 | Does not melt. |
| 4-methyl-1-pentene | TPX | Poor. |
| Aromatic polyamide | Nomex | Does not melt—Chars. |
| Polyester | Mylar | Poor. |
| Polytetrafluoroethylene | Teflon | Does not melt or soften. |
| Pyromellitimide | Kapton | Do. |
| Polyphenylene oxide | PPO | Chars and burns. |
| Polyphenyls | Santowax O, M, P | Melts and vaporizes. |
| HD polyethylene | | Poor. |
| Nylon 6 | | Do. |

It is evident from the above data that the polysulfone resins serve as unique couplants capable of permitting excellent quality ultrasonic measurements at temperatures in excess of 600° F. Because of this quality, they are highly valuable to the chemical processing industries, for they permit a constant monitoring of the condition of process vessels, pipes, and other critical plant equipment without highly expensive and frequently unnecessary shutdowns of the equipment.

The above examples and data are meant to be illustrative only. It is evident that many different embodiments of this invention may be made without departing from the scope and spirit thereof; consequently, its scope is to be limited solely by the appended claims.

We claim:

1. In a process for ultrasonically inspecting an essentially solid body from a surface point on said body where the surface temperature, designated $T_s$, is 400° F. or greater, wherein ultrasonic waves are transmitted from the face of a transducer through a couplant into said body at said surface point and undistorted reflections of said waves are detected after emerging from said body, the improvement which comprises using as said couplant a polysulfone resin having a glass transition temperature less than $T_s$ and a distortion temperature greater than $T_s$.

2. The process of claim 1, wherein $T_s$ is 600° F. or greater.

3. The process of claim 2, wherein $T_s$ is 700° F. or greater.

4. The process of claim 1, wherein said polysulfone resin is a poly(arylene sulfone) having the monomer unit structure.

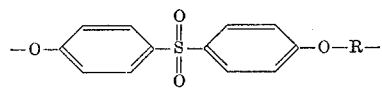

wherein R is a divalent hydrocarbon, halohydrocarbon, or oxahydrocarbon radical.

5. The process of claim 4, wherein R is a radical comprising two phenylene groups linked by an alkylene, haloalkylene, or oxalkylene group.

6. The process of claim 5, wherein the group linking said phenylene groups is an alkylene group of from 1 to 6 carbon atoms.

7. The process of claim 6, wherein said alkylene group is $-C(CH_3)_2-$.

References Cited

UNITED STATES PATENTS 3,393,331 7/1968 Puckett.
3,394,586 7/1968 Cross.

OTHER REFERENCES

From "Bakelite Review," published by Union Carbide Corp., July 1965, inside back cover.

JAMES J. GILL, Primary Examiner

A. E. KORKOSZ, Assistant Examiner

U.S. Cl. X.R.

73—67.5